United States Patent
Bermudez et al.

(10) Patent No.: US 10,427,221 B1
(45) Date of Patent: Oct. 1, 2019

(54) DUAL STAGE ROTARY WORKHOLDING CHUCK

(71) Applicant: Hammill Manufacturing Company, Co-op Tool Division, Maumee, OH (US)

(72) Inventors: David Steven Bermudez, Perrysburg, OH (US); Greg Lentner, Monclova, OH (US); Robert Jay Newell, Northwood, OH (US)

(73) Assignee: Hammill Manufacturing Company, Co-op Tool Division, Maumee, OH (US)

( * ) Notice: Subject to any disclaimer, the term of this patent is extended or adjusted under 35 U.S.C. 154(b) by 0 days.

(21) Appl. No.: 16/114,486

(22) Filed: Aug. 28, 2018

(51) Int. Cl.
  *B23B 31/12* (2006.01)

(52) U.S. Cl.
  CPC ...... *B23B 31/1261* (2013.01); *B23B 31/1292* (2013.01); *B23B 2231/12* (2013.01); *B23B 2260/034* (2013.01); *B23B 2260/07* (2013.01); *Y10T 279/18* (2015.01); *Y10T 279/26* (2015.01)

(58) Field of Classification Search
  CPC .............. B23B 31/103; B23B 31/1261; B23B 31/1292; B23B 2231/36; B23B 2231/12; B23B 2260/07; B23B 2260/034; Y10T 279/18; Y10T 279/26
  See application file for complete search history.

(56) References Cited

U.S. PATENT DOCUMENTS

| | | | | |
|---|---|---|---|---|
| 6,681 A | * | 8/1849 | Martin et al. | B23B 31/1261 279/34 |
| 2,784,977 A | * | 3/1957 | Dinsmore | B23B 31/1284 279/106 |
| 4,828,276 A | * | 5/1989 | Link | B23B 31/1269 279/110 |

FOREIGN PATENT DOCUMENTS

CH          121387 A  *  7/1927  ......... B23B 31/1269

* cited by examiner

*Primary Examiner* — Eric A. Gates
*Assistant Examiner* — Chwen-Wei Su
(74) *Attorney, Agent, or Firm* — McHale Slavin, P.A.

(57) ABSTRACT

A workholding chuck that allows for a sizable gripping range by utilizing a rotary clamping method with dual stage motion. The dual stage rotary gripping chuck allows small diameter parts to be clamped, as well as parts that are larger than the main chuck body diameter. The dual stage motion allows resistance to be first achieved by lightly clamping on a workpiece, which is then converted to a high force-to-movement ratio. The workholding chuck employs two helical connections that allow for a large gripping diameter variation with a short amount of axial travel.

10 Claims, 7 Drawing Sheets

DUAL STAGE ROTARY WORKHOLDING CHUCK

FIELD OF INVENTION

This invention relates to the field of machine tools and, more particularly, to a workholding chuck.

BACKGROUND OF THE INVENTION

Power-operated machine tools have a rotating spindle for use in drilling, reaming and other material removing operations. The material that is being worked on needs to be held in place by the rotating spindle. A workholding chuck is the descriptive term commonly used in a wide variety of applications, where holding of a workpiece is needed. Workholding chucks can be mounted onto lathes or used in milling machines. The actuation (clamping and un-clamping) of the chuck can be accomplished by an external force, such as on a lathe by using its internal drawbar, or by incorporating an internal piston into the chuck.

A current drawback of existing chucks is their lack of gripping range. Typically, a workholding chuck can grip a round part that varies by no more than 0.50" to 1.00" in diameter. More of a variation requires the chuck jaws to be manually moved.

SUMMARY OF THE INVENTION

Disclosed is a workholding chuck that allows for a sizable gripping range by utilizing a rotary clamping method with dual stage motion. The dual stage rotary gripping chuck allows small diameter parts to be clamped, as well as parts that are larger than the main chuck body diameter. A dual stage motion yields a high movement-to-force ratio. After resistance is achieved by lightly clamping on a workpiece, the motion converts to a high force-to-movement ratio. The workholding chuck of the instant invention employs two helical connections that allow for a large gripping diameter variation then high gripping force with a short amount of axial travel of the drawbar adapter or internal piston.

An objective of the invention is to provide a workholding chuck that can grip both small and large diameter workpieces without having to manually move or change any of the chuck components.

Another objective of the invention is to provide a workholding chuck having a first stage that provides light clamping on a workpiece and a second stage that provides a high gripping force on the workpiece.

Still another objective of the invention is to teach the use of two helical connections with overlapping offset clamp arms that operate in a motion similar to the iris on a camera.

Yet still another objective of this invention is to provide a workholding chuck which secures a workpiece tool and causes automatic centering of the workpiece.

Another objective of this invention is to provide a workholding chuck having a first set of clamp arms that apply a first pressure against a workpiece and a second set of clamp arms that apply a second pressure.

Still another objective of this invention is to provide a workpiece having offset clamp arms adjustable to engage workpieces ranging from a small diameter, less than the diameter of the actuator, to a diameter greater than the diameter of the chuck body.

Other objectives and advantages of this invention will become apparent from the following description taken in conjunction with any accompanying drawings wherein are set forth, by way of illustration and example, certain embodiments of this invention. Any drawings contained herein constitute a part of this specification, include exemplary embodiments of the present invention, and illustrate various objects and features thereof.

DETAILED DESCRIPTION OF THE PREFERRED EMBODIMENT

Disclosed is a workholding chuck 10 that allows for a sizable gripping range by utilizing a rotary clamping method with dual stage motion. Referring to the drawings in general, the workholding chuck 10 is formed from a machine adapter 12 coupled to a machine tool, not shown, by a plurality of fasteners 14. The machine adapter 12 supports a centrally disposed drawbar adapter 16 by use of an actuator retainer 18. A cap seal 20 protects the actuator retainer 18 from debris. The drawbar adapter 16 has a lower threaded section 22 and an upper section 24 to receive an actuator 26 having external helical threads 28 constructed and arranged to engage a sun gear 30 having a reciprocal thread 32. The sun gear 30 is biased from the machine adapter 12 by a plurality of springs 36 which support a bearing race 38 having a bearing cage 40 and ball bearings 42.

Figure 1:
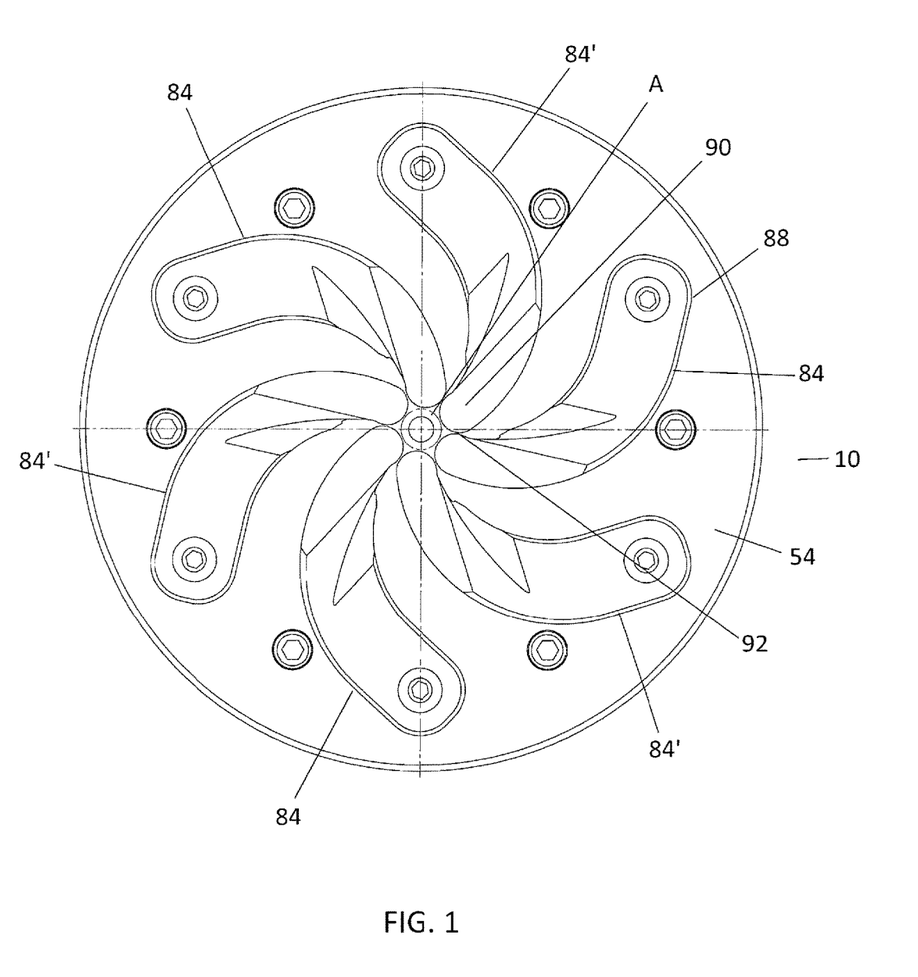
FIG. 1 is a plane front view of the dual stage chuck of the instant invention, illustrating a small diameter workpiece.
Figure 2:
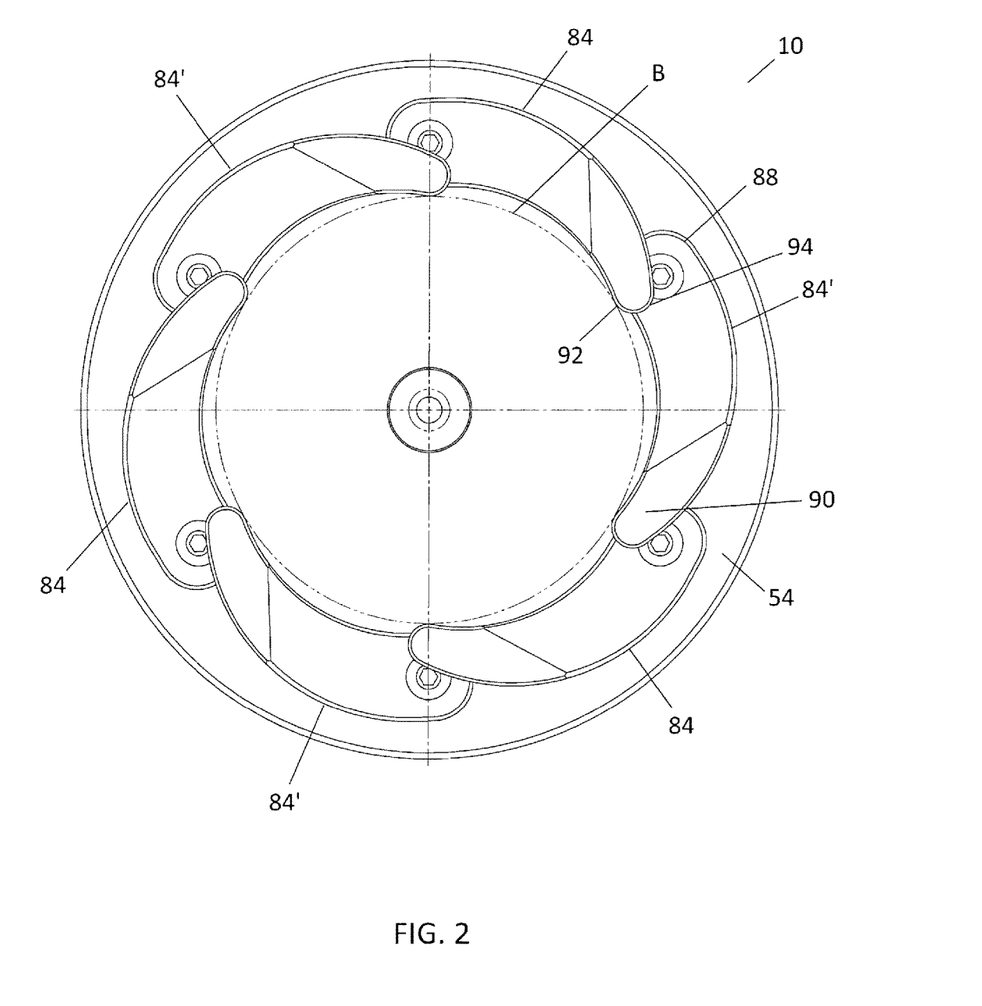
FIG. 2 is a plane front view of the dual stage chuck, illustrating a medium diameter workpiece.
Figure 3:
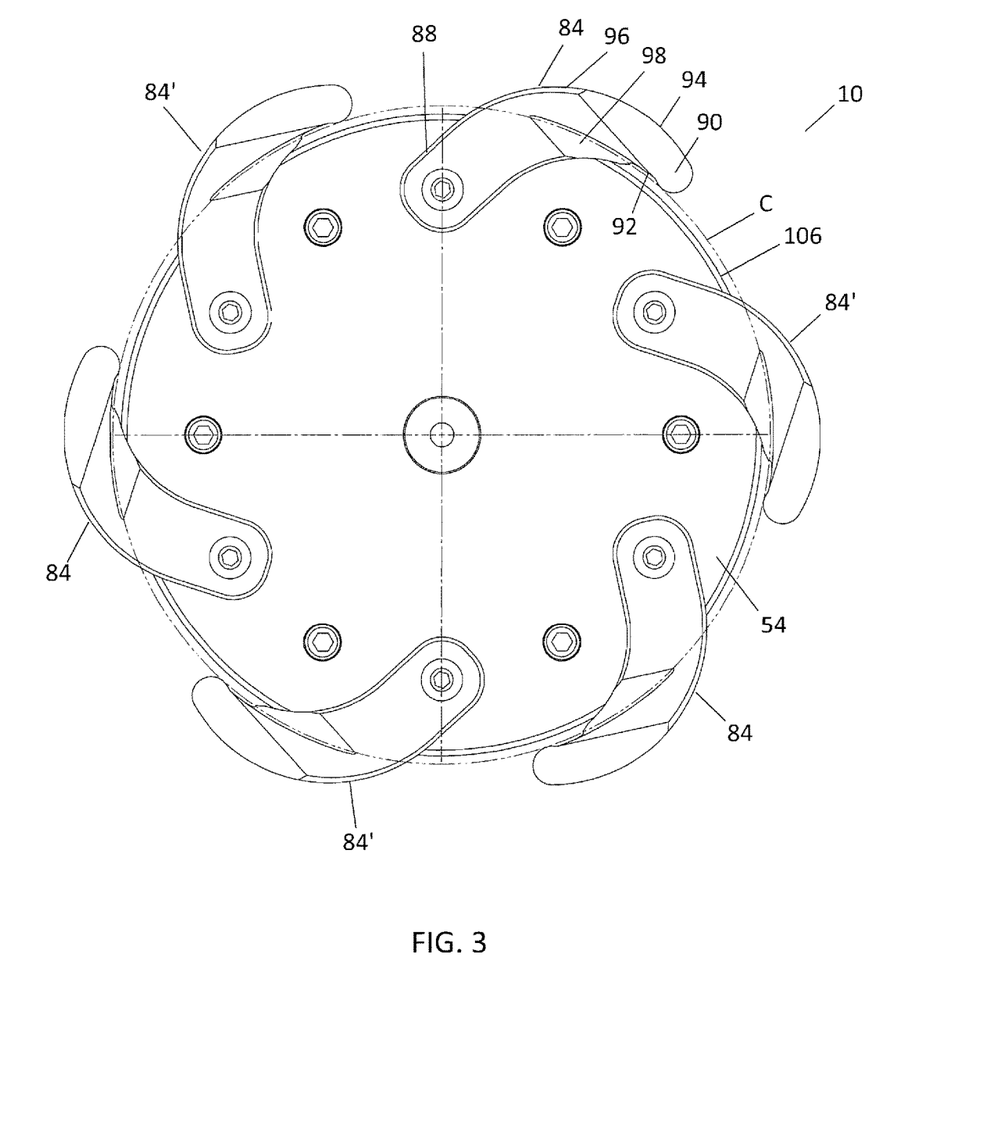
FIG. 3 is a plane front view of the dual stage chuck, illustrating a large diameter workpiece, namely a part larger than the chuck body.
Figure 4:
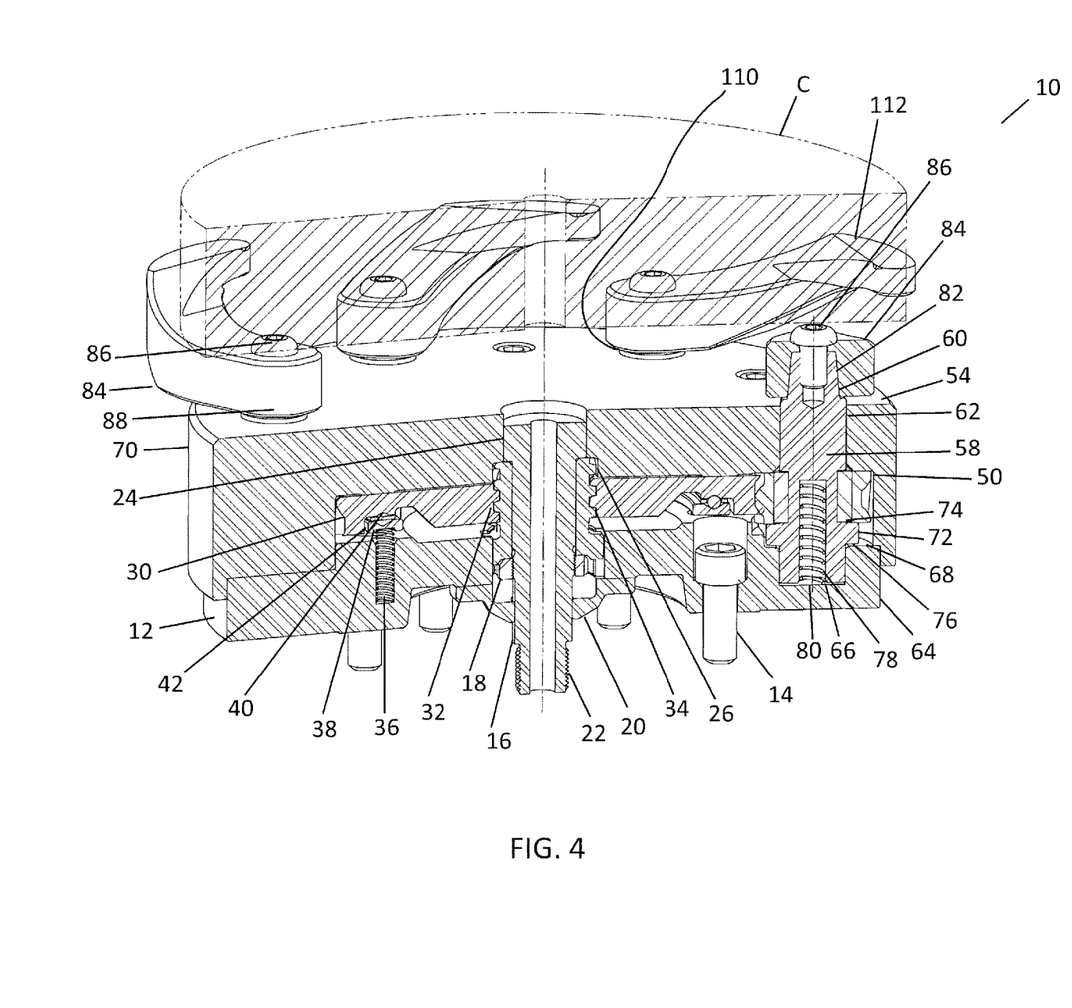
FIG. 4 is a cross sectional view of the dual stage chuck.
Figure 5:
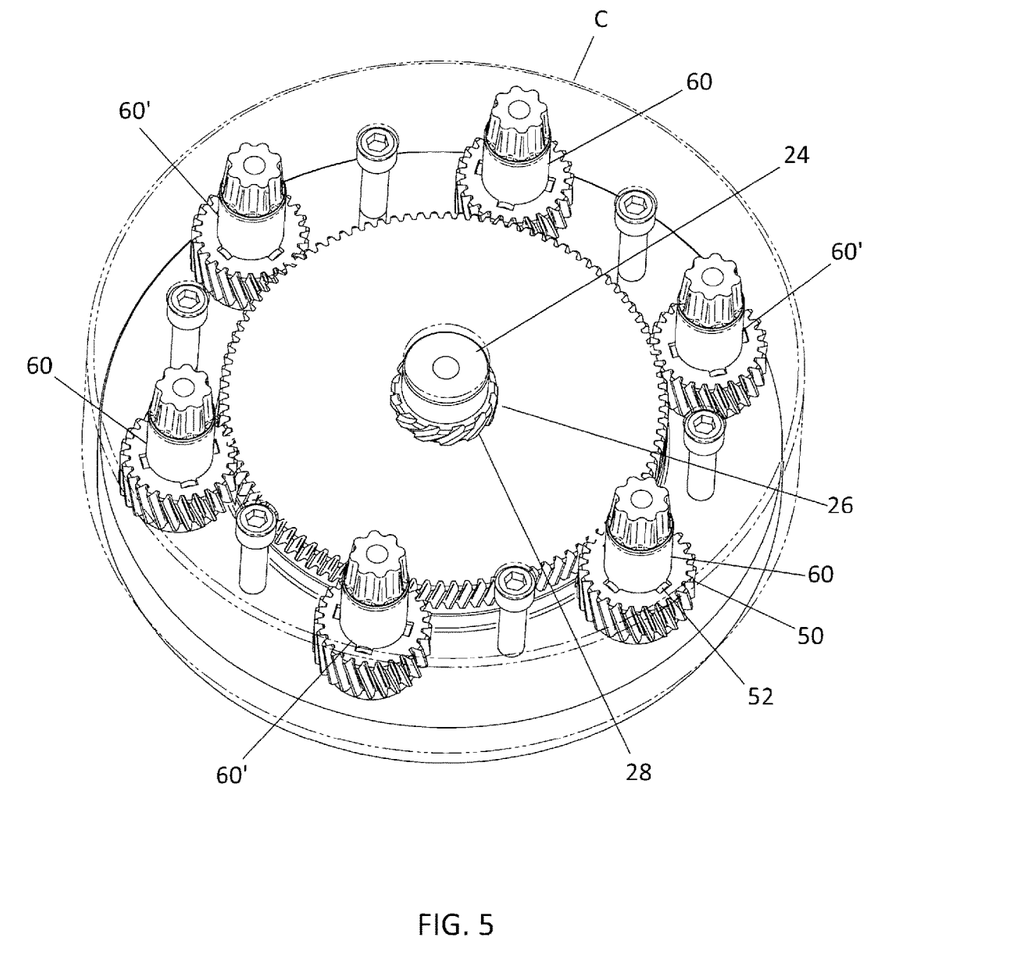
FIG. 5 is a perspective view of the sun gear coupling to the planetary clamp post gears.
Figure 6:
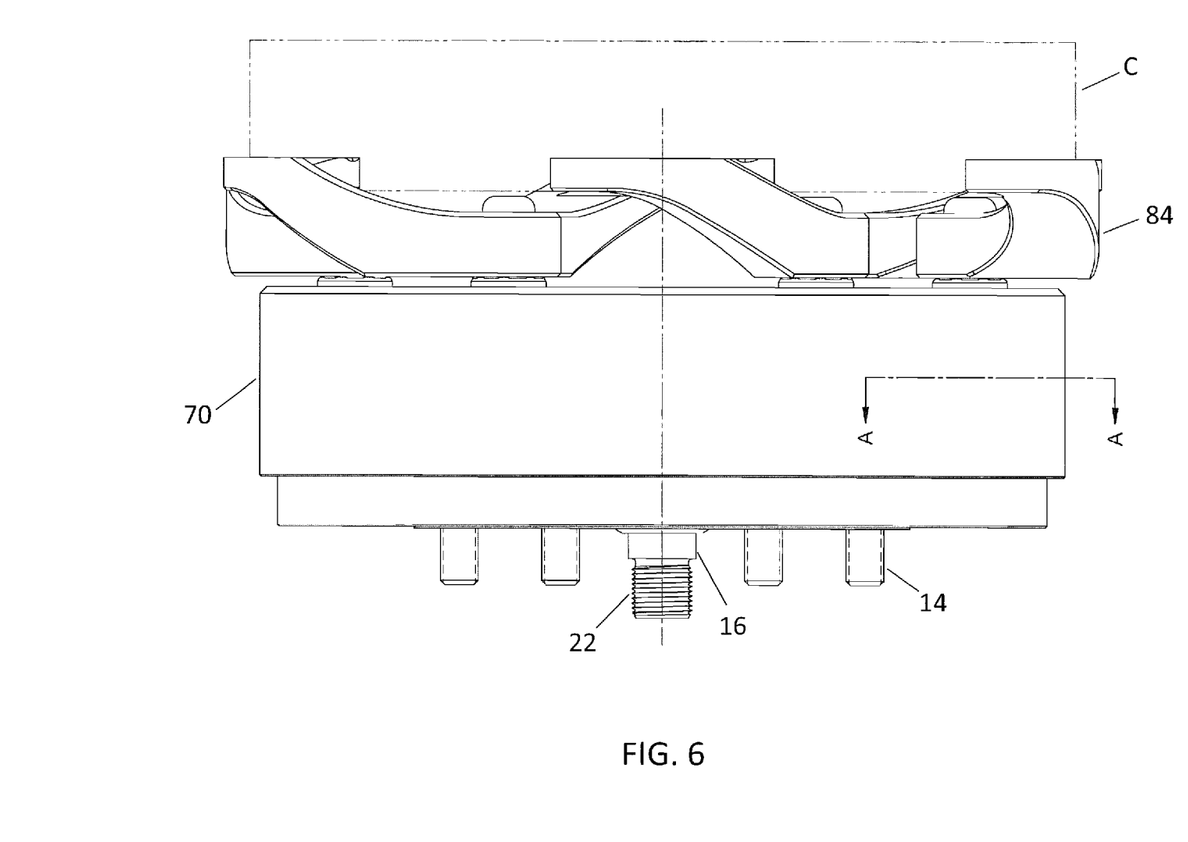
FIG. 6 is a side view of the dual stage chuck.
Figure 7:
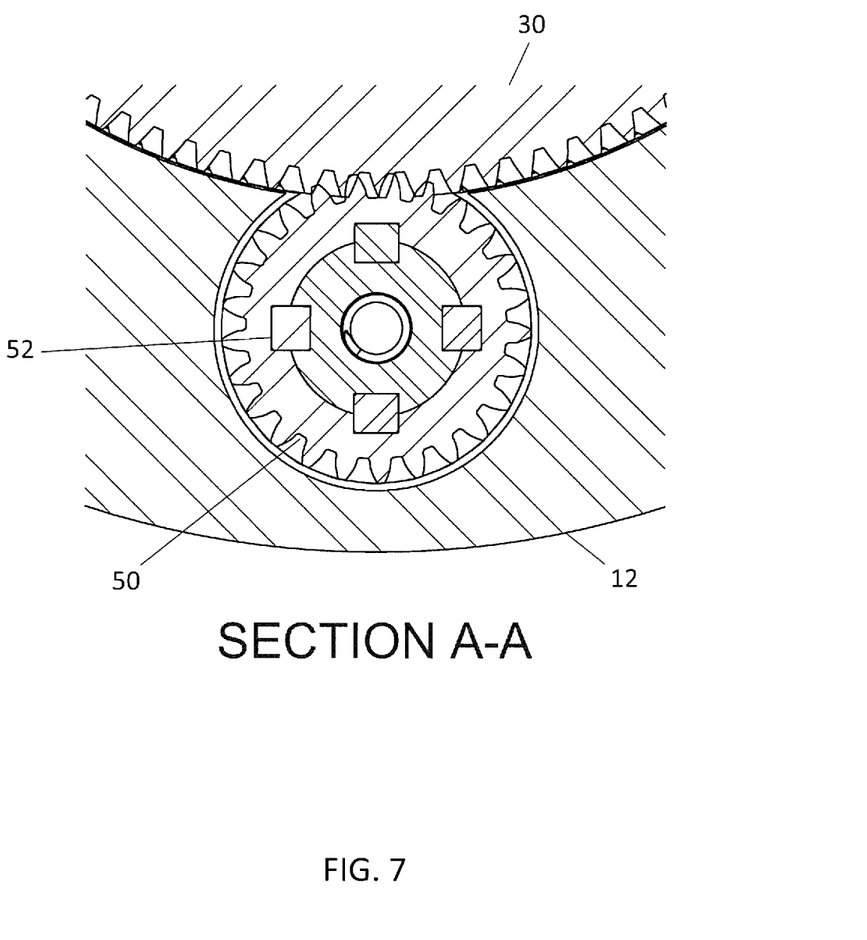
FIG. 7 is a top plane view of a clamp post planetary gear taken along section A-A of FIG. 6.

The sun gear 30 engages a planetary gear 50, which in turn is secured to a clamp post 60 by at least one key 52. In the preferred embodiment, six clamp posts 60 are equally spaced about a body 70 having a frontal chuck face 54. Each clamp post has a central section 58 rotatable through an aperture 62 extending through the body 70. A lower section 64 fits within a socket 66 formed in an upper surface 68 of the machine adapter 12. The clamp posts 60 have a tab 72 with an upper side surface capturing the planetary gear 50 and a lower surface 76 to support the lower section 64 within the socket 66. Each clamp post 60 includes a receptacle 78 for receipt of a biasing spring 80. Each clamp post 60 has a conical shaped upper section 82 for receipt of an offset clamp arm 84; the offset clamp arm 84 being secured to the clamp post 60 by a clamp fastener 86. Each offset clamp arm 84 has a proximal end 88, having an aperture for receipt of the clamp fastener, and a distal end 90 for engaging a workpiece. The shape of the offset clamp arms 84 allow adjoining clamp arms to partially rotate over the top of each other. In one example of a workpiece, A, depicted by a hidden line in FIG. 1, the workpiece A is held in the offset clamp arms 84 on the inner surface 92 of each clamp arm 84. In another example of a workpiece, B, depicted by a hidden line in FIG. 2, the workpiece B is held in the offset clamp arms 84 on the inner surface 92 of each clamp arm 84. In still another example of a workpiece, C, depicted by a hidden line in FIG. 3, the workpiece C is held in the offset clamp arms 84 on the inner surface 92 of each clamp arm 84.

Each offset clamp arm 84 is defined by a shape that allows for overlapping of adjoining offset clamp arms 84. In particular, the proximal end 88 is spaced apart from the distal end 90 by a central section 96. The inner surface 92 of the clamp arm includes a chamfered section 98 positioned between a bottom surface 110 and an upper surface 112. The bottom surface 110 has a first elevation along the proximal end 88 and a second elevation along the distal end 90; the second elevation constructed and arranged to extend over an upper surface 112 of an adjoining clamp arm 84. Similarly, the upper surface 112 has a first elevation along the proximal end 88 and a second elevation along the distal end 90; the first elevation constructed and arranged to fit beneath a bottom surface of an adjoining clamp arm 84.

In operation, the sequence of actuation employs the drawbar adapter 16 and actuator 26, which retract linearly. The actuator 26 is keyed to the drawbar adapter 16 to only allow linear movement. The springs 36 under the sun gear 30 initially keep it in the forward position. As the actuator 26 retracts, the helical thread 28 connection to the sun gear 30 causes it to rotate. Similarly, biasing springs 80 beneath each clamp post 60 initially keep them in a forward position. As the sun gear 30 rotates, the planetary gear 50 connection to the clamp post 60 rotates, causing them to rotate in an opposition direction. In the preferred embodiment, there are six clamp posts 60 engaged by the sun gear 30 causing all of the clamp posts 60 to rotate and close onto a workpiece. Three of the offset clamp arms 84 will center up the workpiece on the largest material areas. After the three offset clamp arms 84 are bottomed out on the workpiece, the rotational motion of the offset clamp arms 84 will be stalled and the actuator 26 and the sun gear 30 become a rigid set.

The drawbar adapter 16, actuator 26, and sun gear 30 continue to build up force. After the force exceeds the spring force under the sun gear 30, the workpiece starts to move backward. The backward movement/force of the sun gear 30 causes the three primary clamp posts 60, which were bottomed out, to move with the sun gear 30, causing the biasing springs 80 to compress. The backward movement/force of the sun gear 30 causes three secondary clamp posts 60' to continue to rotate due to the helical thread 28 connection, and the biasing springs keep the clamp posts 60 in the forward position. The resulting force is applied to the workpiece by the secondary offset clamp arms 84'.

Once the three offset clamp arms 84 bottom out on the workpiece, the three offset clamp arms 84 have centered on the workpiece and the secondary offset clamp arms 84' have compensated to contact the workpiece. The "pull-down" clearance is varied depending on how much the offset clamp arms 84' had to compensate. In this position, the sun gear 30, clamp posts 60, offset clamp arms 84, and the workpiece are effectively a rigid set.

This operation can also be viewed wherein, as a drawbar force builds upon the drawbar adapter 16, all sets of biasing springs 80 compress until the primary clamp posts 60 bottom out on the drawbar adapter 16. With the clamp posts 60 being spring loaded in a forward position, after the offset clamp arms 84 grip a workpiece, which stops radial motion, additional pull-back of the drawbar adapter 16 will compress the springs 80, pulling the entire clamp post/offset clamp arm back, thereby pulling the workpiece tight against the chuck face 54. The final drawbar force then builds up with the load, transferring to the clamp arms 84 via the planetary gear 50 and sun gear 30. The drawbar force is only directly sent to the primary offset clamp arms; the secondary offset clamp arms 84' only clamp with a spring force.

The term "coupled" is defined as connected, although not necessarily directly, and not necessarily mechanically. The use of the word "a" or "an" when used in conjunction with the term "comprising" in the claims and/or the specification may mean "one," but it is also consistent with the meaning of "one or more" or "at least one." The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements, possesses those one or more steps or elements, but is not limited to possessing only those one or more elements.

It is to be understood that while a certain form of the invention is illustrated, it is not to be limited to the specific form or arrangement herein described and shown. It will be apparent to those skilled in the art that various changes may be made without departing from the scope of the invention, and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A dual stage rotary gripping chuck comprising:
   a machine adapter having a centrally disposed actuator movable by a drawbar adapter;
   a sun gear engaging said actuator, said sun gear coupled to said machine adapter by a bearing support race positioned by a plurality of biasing springs;
   a body positioned over said machine adapter having a plurality of apertures;
   a clamp post extending through each said aperture, each said clamp post having an upper end and a lower end;
   a planetary gear secured to the lower end of each said clamp post for engaging said sun gear; and
   an offset clamp arm having a proximal end secured to the upper end of each said clamp post and a distal end extending outwardly therefrom;
   wherein said distal end of said offset clamp arm is adjustable to engage workpieces ranging from a small diameter, less than the diameter of the actuator, to a large diameter greater than the diameter of the chuck body.

2. The dual stage rotary gripping chuck according to claim 1 wherein said body has six apertures for receipt of said clamp posts equally spaced apart about said chuck face.

3. The dual stage rotary gripping chuck according to claim 1 wherein a drawbar force builds upon said drawbar adapter, compressing said biasing springs until said clamp posts bottom out on said drawbar adapter.

4. The dual stage rotary gripping chuck according to claim 1 wherein said clamp posts are spring loaded in a forward position.

5. The dual stage rotary gripping chuck according to claim 1 wherein said offset clamp arms grip a workpiece, which stops radial motion, and a pull-back of said drawbar adapter will compress the biasing springs, pulling said clamp posts back, thereby pulling the workpiece tight against the face of said chuck body.

6. The dual stage rotary gripping chuck according to claim 1 wherein a final drawbar force builds up with a load, transferring to each said clamp arm via said planetary gear and said sun gear; the drawbar force is directed to said clamp arms.

7. The dual stage rotary gripping chuck according to claim 1 wherein six said clamp posts are constructed and arranged wherein three of said six clamp posts clamp with a first force and the remaining three of said six clamp posts clamp with a second force.

8. The dual stage rotary gripping chuck according to claim 1 including a cap seal secured to said machine adapter to protect said actuator retainer from debris.

9. The dual stage rotary gripping chuck according to claim 1 wherein said drawbar adapter is held in position by an actuator retainer.

10. The dual stage rotary gripping chuck according to claim 1 wherein actuator includes a helical thread for engaging reciprocal threads formed in said sun gear.

* * * * *